United States Patent
Moseley

(10) Patent No.: US 10,399,473 B1
(45) Date of Patent: Sep. 3, 2019

(54) PORTABLE ARMREST FOR VEHICLE DRIVERS

(71) Applicant: Donna Kay Moseley, Conroe, TX (US)

(72) Inventor: Donna Kay Moseley, Conroe, TX (US)

( * ) Notice: Subject to any disclaimer, the term of this patent is extended or adjusted under 35 U.S.C. 154(b) by 0 days.

(21) Appl. No.: 15/997,688

(22) Filed: Jun. 4, 2018

(51) Int. Cl.
*B68G 11/04* (2006.01)
*B60N 2/75* (2018.01)

(52) U.S. Cl.
CPC ............. *B60N 2/787* (2018.02); *B68G 11/04* (2013.01)

(58) Field of Classification Search
CPC ........ B60N 2/787; B60N 2/882; A47C 7/021; A47C 7/0213; A47C 7/383; A47C 7/42; A47C 7/425; B68G 11/04; A61G 13/1235; A61G 13/124; A47G 9/1081; A47G 9/1072; A47G 2009/1018
See application file for complete search history.

(56) References Cited

U.S. PATENT DOCUMENTS

| | | | |
|---|---|---|---|
| 2,184,181 A | 12/1939 | Fall | |
| 2,296,628 A * | 9/1942 | Coppock | B60N 2/787 297/411.23 |
| 2,619,155 A | 11/1952 | Buck | |
| 4,064,578 A * | 12/1977 | Yamada | A47C 7/021 297/452.27 |
| 4,393,530 A * | 7/1983 | Stark | A47G 9/10 5/636 |
| 4,776,048 A * | 10/1988 | Wilheim | B60N 2/882 5/636 |
| 4,842,329 A * | 6/1989 | Owens | A47C 7/021 297/188.01 |
| 4,858,995 A | 8/1989 | Young | |
| 4,938,439 A * | 7/1990 | Fried | A47G 23/0608 248/118.5 |
| D338,195 S * | 8/1993 | Sugerman | D14/461 |
| 5,332,288 A | 7/1994 | Coates | |
| D372,903 S * | 8/1996 | Juster | D14/459 |
| 6,273,504 B1 * | 8/2001 | Pace | A47C 7/021 297/217.1 |
| 6,739,008 B1 * | 5/2004 | Kindrick | A47C 7/021 5/655.9 |
| 7,431,396 B1 | 10/2008 | Dasso | |
| 7,717,518 B2 | 5/2010 | Elung et al. | |
| 8,336,963 B1 * | 12/2012 | DeMonaco | B60N 2/787 297/411.23 |
| 9,193,285 B1 * | 11/2015 | Jordan | A47C 7/546 |
| 9,827,889 B1 * | 11/2017 | Cline | B60N 2/78 |

(Continued)

FOREIGN PATENT DOCUMENTS

| | | | | |
|---|---|---|---|---|
| CA | 2996109 A1 * | 3/2017 | ............ | A47G 9/1081 |
| EP | 1787549 A1 * | 5/2007 | ............. | A47C 7/021 |

*Primary Examiner* — Timothy J Brindley
(74) *Attorney, Agent, or Firm* — Kenneth A. Roddy

(57) ABSTRACT

A portable armrest for vehicle drivers configured to be removably received and supported on either side of the driver to cushion and provide comfortable support for the driver's elbow or forearm, prevent leaning, and place the arm and hand in a position to properly and safely grip the steering wheel includes a foam cushioning support member enclosed in a removable fabric cover, the cushioning support member having a rectangular top portion formed of a soft viscoelastic polyurethane memory foam material having a lower firmness and resilience, and a pentagonal lower portion formed of a second, more supportive polyurethane foam material.

11 Claims, 2 Drawing Sheets

(56) References Cited

U.S. PATENT DOCUMENTS

| | | | |
|---|---|---|---|
| 2002/0130538 A1* | 9/2002 | Artsvelyan | B60N 2/787 |
| | | | 297/227 |
| 2004/0255385 A1* | 12/2004 | England | A47C 7/021 |
| | | | 5/655.9 |
| 2010/0299838 A1* | 12/2010 | Lanci | B60N 2/882 |
| | | | 5/645 |
| 2013/0257112 A1* | 10/2013 | Smith | B62J 1/20 |
| | | | 297/183.1 |
| 2014/0191544 A1* | 7/2014 | Comber | A47D 1/10 |
| | | | 297/224 |
| 2015/0107025 A1* | 4/2015 | Dauphin | A47C 7/383 |
| | | | 5/638 |
| 2017/0245644 A1* | 8/2017 | Lobel | A47C 31/023 |
| 2018/0125244 A1* | 5/2018 | Johnson | B64D 11/0647 |
| 2018/0281637 A1* | 10/2018 | Ott | B60N 2/882 |

* cited by examiner

PORTABLE ARMREST FOR VEHICLE DRIVERS

BACKGROUND OF THE INVENTION

1. Field of the Invention

This invention relates generally to portable armrest devices for use in a vehicle and, more particularly, to a portable armrest for vehicle drivers formed of foam materials of two different shapes, heights, densities, and firmness, configured to be removably received and supported on either side of the driver to cushion and provide comfortable support for the driver's elbow or forearm, prevent leaning, and place the arm and hand in a position to properly and safely grip the steering wheel.

2. Background Art

Motor vehicles are typically provided with an arm rest on the adjacent to the left side of driver, and most are provided with an elbow support on a center console located between the driver's seat and the passenger seat. One of the problems experienced by drivers is that their arms get tired when driving. The arm rests and elbow supports provided in motor vehicles are spaced to the extent that a driver would have to lean to one side or the other in order to use them. Leaning while driving misaligns spine and creates stress on the body and ultimately fatigue and an unsafe condition for long and short driving trips.

Another problem encountered by drivers resting their arm or elbow on the door arm rest or elbow support of the center console is that their hands are not necessarily positioned to properly and safely grip the steering wheel. The gripping position is described in terms of the placement of the driver's hands related to numbers on a clock. The proper steering wheel gripping position has changed over the years with the advent of explosive airbags. Some authorities recommended gripping the wheel at a 10 o'clock and 2 o'clock position, and others recommended an 8 o'clock and 4 o'clock position. The NHTSA (National Highway Traffic Safety Administration) now recommends a 9 o'clock and 3 o'clock gripping position, because the 10 o'clock and 2 o'clock position can be dangerous in vehicles with smaller steering wheels and equipped with airbags, and cause serious arm and body injuries due to the force of the exploding airbag.

There are several patents that are directed toward arm rests and portable armrests for motor vehicles. The following are several examples.

Fall, U.S. Pat. No. 2,184,181, discloses an arm rest for motor vehicles comprising a pair of connected laterally spaced arms curved to conform with and engage the back of a seat of a vehicle and being of hook form at their upper ends for engagement over the top of said back of the seat. The arms are yieldable and converge downwardly from their upper ends that adjustably hold an arm-supporting base formed of a cushioned wooden block.

Buck, U.S. Pat. No. 2,619,155, discloses an armrest for vehicle seats which includes a standard having upper and lower sections with aligned shank portions adapted for adjustment toward and away from each other, a sleeve slidably mounted on the shanks, means for adjustably anchoring the sleeve to the adjacent shank ends for holding the shanks in adjusted position. The upper section of the standard has a seat back-engaging hook at its upper end and the lower section has a rearwardly offset lower end with seat engaging members at the outer ends of the sections and an arm rest projecting laterally of the sleeve.

Young, U.S. Pat. No. 4,858,995, discloses a portable arm rest for the center console of a motor vehicle between a pair of seats which includes an elongated encased block of cushion material having a pair of wing flaps depending from opposite sides of the arm rest member and adapted to depend on opposite sides of the center console when the arm rest is in its operative position, the wing flaps being weighted to hold the arm rest member in its operative position.

Coates, U.S. Pat. No. 5,332,288, discloses a detachable arm cushion for an automobile arm rest for cushioning the arm of an occupant of the vehicle resting on the arm rest mounted on an inside panel of the vehicle. The device includes a cushion having an interior pad of yieldable foamed rubber or synthetic polymer which is elongated to fit on the arm rest surface held within an exterior flexible fabric cover, and anchoring means for anchoring the cushion on the arm rest in the form of two or more anchoring straps, affixed at one end to the cushion at lengthwise spaced apart points along one long side thereof and carrying at their other ends attachment members for detachable attachment to cooperating attachment members mounted in a row on the inside vehicle panel above the arm rest at more or less corresponding spaced apart points.

Dasso, U.S. Pat. No. 7,431,396, discloses a portable armrest cushion that can be used with rigid seat armrests to provide extra cushion support for the user's arm. In one embodiment, the cushion has an outer covering and an inner padded structure. The inner padded structure may be a gel like material. The outer covering may be made of either a leather material or a material that is bacterial resistant. The covered armrest cushion has a relatively flat lower area for engagement with the seat's armrest and non-rigid cushion stabilizers on the lower portion of the cushion allow sliding engagement with the upper side portions of the armrest. A semi-adhesive non-skid pad may be added to the lower inside portion of the armrest cushion to inhibit lateral movement of the cushion.

Elung, et al, U.S. Pat. No. 7,717,518, discloses a driver's elbow support apparatus. The support has distal sides and front, back, upper and lower sides constructed as a cushioned or inflatable device having at least a flexible upper surface and a lower surface configured to fit on the lap of the driver of a motor vehicle when the driver is seated adjacent the steering wheel of the vehicle whereby the elbows of the driver are supported such that the driver's hands are maintained in the 9:15 position on the steering wheel. The device is provided with an apron attached to the front side, fasteners attached to each of the distal sides, plural fasteners attached to the back side, and plural, inverted u-shape locating members configured on the lower side of the cushion device.

None of these references disclose a portable armrest for vehicle drivers formed of foam materials of two different shapes, heights, densities, and firmness, configured to be removably received and supported on either side of the driver to cushion and provide comfortable support for the driver's elbow or forearm, prevent leaning, and place the arm and hand in a position to properly and safely grip the steering wheel.

SUMMARY OF THE INVENTION

The present invention overcomes the aforementioned problems and is distinguished over the prior art in general, and these patents in particular by a portable armrest for vehicle drivers formed of foam materials of two different shapes, heights, densities, and firmness, configured to be removably received and supported on either side of the driver to cushion and provide comfortable support for the driver's elbow or forearm, prevent leaning, and place the arm and hand in a position to properly and safely grip the steering wheel.

The portable armrest includes a fabric cover having a closable opening adjacent to an upper end thereof, an interior compartment in communication with the opening, and fastener means on the opening. A foam cushioning support member formed of foam materials of two different shapes, heights, densities, and firmness, is removably received within the fabric cover.

The foam cushioning support member has a rectangular top portion formed of a soft viscoelastic polyurethane memory foam material having a lower firmness and resilience, and a pentagonal lower portion formed of a second, more supportive polyurethane foam material having a higher firmness and resilience than the first material.

The rectangular top portion is defined by a horizontal top wall and bottom wall having a width, laterally opposed side walls, and opposed front and back end walls all of the same height, and a length defined as the distance between the front and back end walls. The pentagonal lower portion is defined by a top wall of the same width as the top and bottom walls of the top portion, a narrower bottom wall having a width, a longer vertical side wall having a height, an opposed shorter vertical side wall having a height less than the longer vertical side wall, a diagonal wall extending angularly upward and outward at an acute angle between the narrower bottom end wall and the shorter vertical side wall, and opposed front and back end walls and a length (distance between the front and back end walls) being the same length as the length of the rectangular top portion. The bottom wall of the rectangular top portion is bonded to the top wall of the pentagonal lower portion by an adhesive to form an integral unit.

One of the significant features and advantages of the present invention is that it is configured to be removably received and supported on either side of the driver to cushion and provide comfortable support for the driver's elbow or forearm, prevent leaning, and place the arm and hand in a position to properly and safely grip the steering wheel.

Another feature and advantage of the present invention is that it may be placed and supported on the left hand side of a seated driver of a motor vehicle adjacent to the existing arm rest on the door panel of the door, or on the right hand side of the driver adjacent to the existing center console and elbow support.

Another feature and advantage of the present invention is that the driver may rest his or her elbow or forearm on the top of the portable arm rest and the higher-density viscoelastic memory foam of the rectangular top portion softens in reaction to body heat, allowing it to mold to the driver's elbow or forearm to provide a soft comfortable support.

Another feature and advantage of the present invention is that the higher firmness and resilience of the polyurethane foam material of the pentagonal lower portion of the cushioning support member allows it to conform to the adjacent support surfaces and maintains the top portion at the intended height.

Another feature and advantage of the portable armrest that two of the armrests may be utilized, one on the left hand side and the other on the right hand side of the driver, depending upon the size of the driver and the particular arrangement the existing arm rest on the door panel and the existing center console of the particular motor vehicle.

Another feature and advantage is that the height of the portable arm rest prevents the driver from having to lean to one side or the other while driving, which misaligns the spine and creates stress on the body and ultimately fatigue and an unsafe condition for long and short driving trips.

Another feature and advantage is that the height of the portable arm rest places the driver's arm such that their hands are positioned to properly and safely grip the steering wheel at approximately a 9 o'clock and 3 o'clock gripping position, to reduce the possibility of serious arm and body injuries due to the force of the exploding airbag built into the steering wheel.

A further feature and advantage of the present invention is that it is simple in construction, inexpensive to manufacture and safe and reliable in operation.

Other features and advantages of the invention will become apparent from time to time throughout the specification and claims as hereinafter related.

DETAILED DESCRIPTION OF THE INVENTION

In the following discussion and as used herein, the following terms have the following meanings. "Density" is a property of a material defined by its mass divided by its volume. "Resilience" describes the ability and length of time required for a material to return to its original shape after it has been deformed. "Firmness" is measured as Indentation Load Deflection ("ILD") or Indentation Force Load Deflection ("IFD"). "ILD" or "IFD" measures the force (in pounds-force) required to compress or make a 1" dent into a foam sample measuring 15"×15"×4" by an 8-inch-diameter (50 sq. in) disc (i.e., 25 percent of its thickness) known as ILD or IFD @ 25% compression (ASTM standard D3574). For example, if the sample requires 36 pounds of pressure to indent it 1 inch, its ILD is 36. ILD or IFD ratings for memory foams range between super soft (ILD or IFD 10) and semi-rigid (ILD or IFD 12).

Different types of foam materials have a range of applicable densities and firmness. For example, typical polyurethane foam has a density of about 1.2 lbs. per cubic ft. and an ILD or IFD (firmness) of about 33. High density foam has a density of about 1.9 lbs. per cubic ft. and an ILD or IFD of from about 52 to about 58. "Memory foam", also known as viscoelastic polyurethane foam, is a polyurethane foam with additional chemicals added to increase density and lower firmness and resilience. Memory foam is softer than other foams, but is less supportive. Memory foam has a density of about 2 lbs. per cubic ft. to about 8 lbs. per cubic ft. and an ILD or IFD of from about 9 to about 16. Higher-density memory foam softens in reaction to body heat, allowing it to mold to a warm body in a few minutes.

Figure 1:
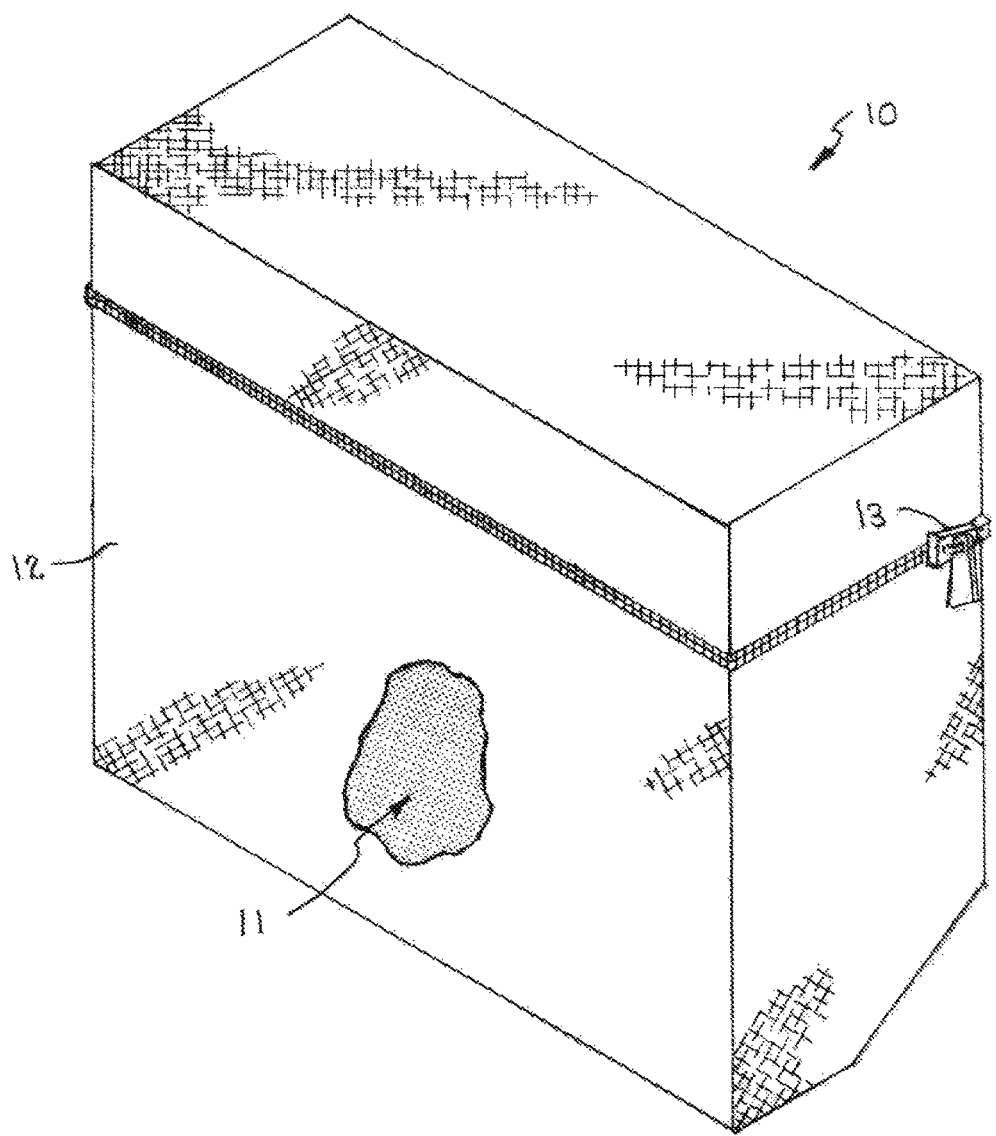
FIG. 1 is a perspective view of the portable armrest for vehicle drivers in accordance with the present invention.
Figure 2:
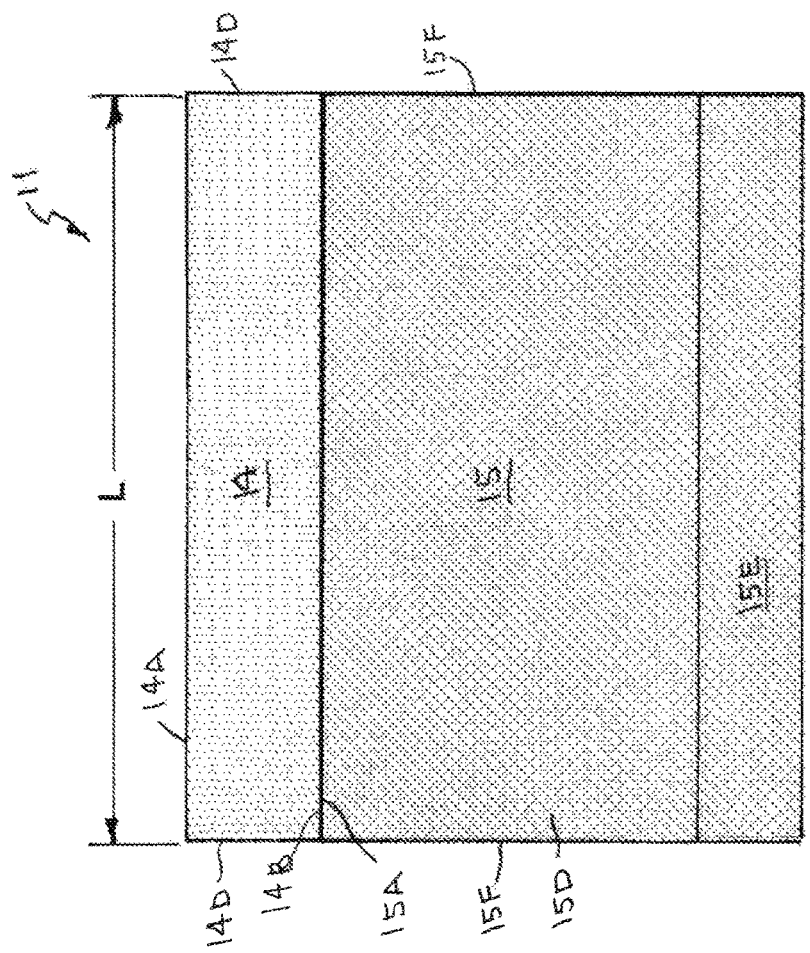
FIG. 2 is a side elevation view of the foam cushioning support member of the armrest with the outer cover removed.
Figure 3:
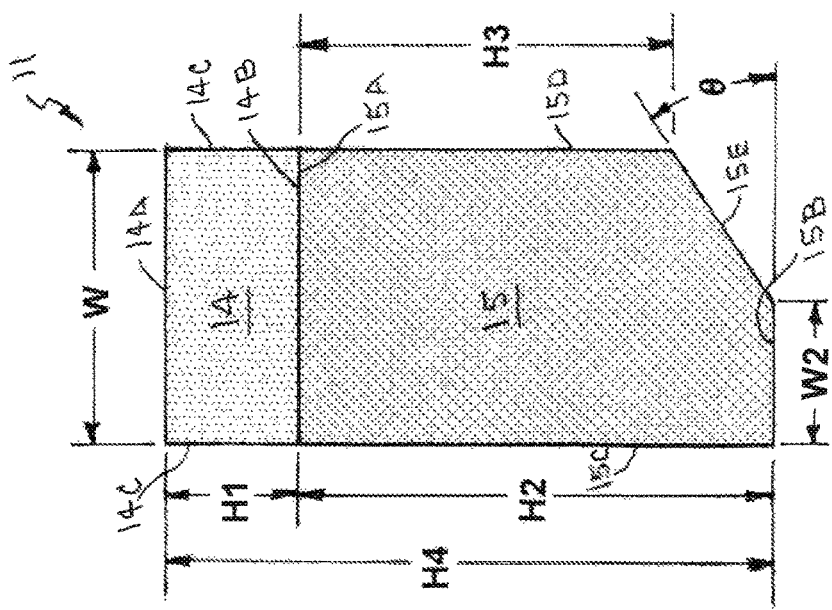
FIG. 3 is an end view of the of the foam cushioning support member of the armrest with the outer cover removed.

Referring now to the drawings by numerals of reference, there is shown in FIGS. 1-3, a preferred embodiment of the portable armrest for vehicle drivers, designated generally, as 10. The portable armrest 10 comprises a foam cushioning support member 11 formed of foam materials of two different shapes, heights, densities, and firmness, which is removably contained within an outer fabric cover 12 having a fastener mechanism 13 adapted to allow it to be opened such the cushioning support member 11 may installed and removed therefrom. In the illustrated example, the fastener mechanism 13 is shown as a zipper, however, it should be understood that the fastener mechanism may be any conventional fastener means, such as for example, mating hook and loop fabric fasteners, snaps, or buttons.

As best seen in FIGS. 2 and 3, the foam cushioning support member 11 has a rectangular top portion 14 formed of a soft viscoelastic polyurethane foam (memory foam) material having a lower firmness and resilience, and a pentagonal lower portion 15 formed of a second, more supportive polyurethane foam material having a higher firmness and resilience than the first material.

The rectangular top portion 14 of the foam cushioning support member 11 is defined by a horizontal top wall 14A and bottom wall 14B having a width W, laterally opposed side walls 14C, and opposed front and back end walls 14D all of the same height H1. The rectangular top portion 14 has a length L (defined as the distance between the front and back end walls 14D).

The pentagonal lower portion 15 of the foam cushioning support member 11 is defined by a top wall 15A of the same width W as the top and bottom walls of the top portion 14, a narrower bottom wall 15B having a width W2, a first vertical side wall 15C having a height H2, an opposed shorter vertical side wall 15D having a height H3, a diagonal wall 15E extending angularly upward and outward at an acute angle θ from narrower bottom end wall 15B to the shorter vertical side wall 15D and lengthwise between the opposed front and back end walls 15F. The length L of the pentagonal lower portion 15 (distance between the front and back end walls 15F) is the same length as the length of the rectangular top portion 14. The bottom wall 14B of the rectangular the top portion 14 is bonded to the top wall 15A of the pentagonal lower portion 15 by an adhesive to form an integral unit.

The total length L (distance between the front and back end walls) of the foam cushioning support member 11 may be of from about 10 inches to about 12 inches, and more particularly about 11 inches. The total width W (distance between the laterally opposed side walls) of the foam cushioning support member 11 may be of from about 3⅜ inches to about 5⅜ inches, and more particularly about 4⅜ inches. The total height H4 of the of the foam cushioning support member 11 may be from about 7½ inches to about 10½ inches, and more particularly about 9 inches.

The height H1 of the rectangular viscoelastic (memory foam) top portion 14 may be of from about 1½ inches to about 2½ inches, and more particularly about 2 inches. The height H2 of the pentagonal lower portion 15 may be of from about 6 inches to about 8 inches, and more particularly about 7 inches.

The softer less resilient viscoelastic polyurethane (memory foam) material of the rectangular top portion 14 may have a density of from about 2.5 lbs. per cubic ft. to about 8 lbs. per cubic ft., and a firmness (i.e., ILD or IFD) of from about 9 to less than about 20 or, more particularly, a density of between about 2.8 lbs. per cubic ft. and about 6 lbs. per cubic ft., and a firmness of between about 9 and about 15.

The more supportive polyurethane foam material of the pentagonal lower portion 15 having a higher firmness and resilience may have a density of from about 1 lb. per cubic ft. to about 3 lbs. per cubic ft., and a firmness (i.e., ILD or IFD) of from about 20 to about 150 or, more particularly, a density of between about 1.2 lbs. per cubic ft. and about 2 lbs. per cubic ft., and a firmness of between about 30 and about 40.

The diagonal wall 15E extending angularly upward and outward at an acute angle θ between the narrower bottom end wall 15B and the shorter vertical side wall 15D of the pentagonal lower portion 15 may be from about 30° to about 40°, or more particularly an angle of about 33° to about 35°.

Installation and Operation

The present portable armrest 10 may be placed and supported on the left hand side of a seated driver of a motor vehicle adjacent to the existing arm rest on the door panel of the door, or on the right hand side of the driver adjacent to the existing center console and elbow support. The driver may then rest his or her elbow or forearm on the top of the portable arm rest. The higher-density viscoelastic memory foam of the rectangular top portion 14 of the cushioning support member 11 softens in reaction to body heat, allowing it to mold to the driver's elbow or forearm to provide a soft comfortable support. The higher firmness and resilience of the polyurethane foam material of the pentagonal lower portion 15 of the cushioning support member 11 of the portable armrest 10 allows it to conform to the adjacent support surfaces and maintains the top portion 14 of the portable armrest at the intended height.

It should be understood that two portable armrests 10 may be utilized, one on the left hand side and the other on the right hand side of the driver, depending upon the size of the driver and the particular arrangement the existing arm rest on the door panel and the existing center console of the particular motor vehicle.

The height of the portable arm rest 10 prevents the driver from having to lean to one side or the other while driving, which misaligns spine and creates stress on the body and ultimately fatigue and an unsafe condition for long and short driving trips. The height of the portable arm rest 10 also places the driver's arm such that their hands are positioned to properly and safely grip the steering wheel at approximately a 9 o'clock and 3 o'clock gripping position, to reduce the possibility of serious arm and body injuries due to the force of the exploding airbag built into the steering wheel.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A portable armrest for vehicle drivers, comprising:
   a fabric cover having a closable opening adjacent to an upper end thereon, an interior compartment in communication with said opening, and fastener means on said opening selected from the group consisting of zippers, hook-and-loop fasteners, snaps, and buttons; and a foam cushioning support member formed of foam materials of two different shapes, heights, densities, and firmness, removably received within said fabric cover;

said foam cushioning support member having a rectangular top portion formed of a soft viscoelastic polyurethane memory foam material having a lower firmness and resilience, and a pentagonal lower portion formed of a second, more supportive polyurethane foam material having a higher firmness and resilience than the first material;

said rectangular top portion defined by a horizontal top wall and bottom wall having a width, laterally opposed side walls, and opposed front and back end walls all of the same height, and a length defined as the distance between said front and back end walls; and said pentagonal lower portion defined by a top wall of the same width as the top and bottom walls of said top portion, a narrower bottom wall having a width, a longer vertical side wall having a height, an opposed shorter vertical side wall having a height less than said longer vertical side wall, a diagonal wall extending angularly upward and outward at an acute angle from said narrower bottom end wall and said shorter vertical side wall, and between said opposed front and back end walls, said pentagonal lower portion having a length defined as the distance between said front and back end walls being the same length as said length of said rectangular top portion; and said bottom wall of said rectangular top portion bonded to said top wall of said pentagonal lower portion by an adhesive to form an integral unit.

2. The portable armrest for vehicle drivers according to claim 1, wherein
the viscoelastic polyurethane memory foam material of said rectangular top portion has a density of from about 2.5 lbs. per cubic ft. to about 8 lbs. per cubic ft., and a firmness of from about 9 IFD to less than about 20 IFD.

3. The portable armrest for vehicle drivers according to claim 1, wherein
the viscoelastic polyurethane memory foam material of said rectangular top portion has a density of between about 2.8 lbs. per cubic ft. and about 6 lbs. per cubic ft., and a firmness of between about 9 IFD and about 15 IFD.

4. The portable armrest for vehicle drivers according to claim 1, wherein
the polyurethane foam material of said pentagonal lower portion has a density of from about 1 lb. per cubic ft. to about 3 lbs. per cubic ft., and a firmness of from about 20 IFD to about 150 IFD.

5. The portable armrest for vehicle drivers according to claim 1, wherein
the polyurethane foam material of said pentagonal lower portion has a density of between about 1.2 lbs. per cubic ft. and about 2 lbs. per cubic ft., and a firmness of between about 30 IFD and about 40 IFD.

6. The portable armrest for vehicle drivers according to claim 1, wherein
the total length, defined as the distance between said front and back end walls, of said foam cushioning support member is from about 10 inches to about 12 inches, and the total width, defined as the distance between the laterally opposed side walls, of the foam cushioning support member is from about 3⅜ inches to about 5⅜ inches.

7. The portable armrest for vehicle drivers according to claim 1, wherein
the total length, defined as the distance between said front and back end walls, of said foam cushioning support member is about 11 inches, and the total width, defined as the distance between the laterally opposed side walls, of the foam cushioning support member is about 4⅜ inches.

8. The portable armrest for vehicle drivers according to claim 1, wherein
the height of said rectangular top portion is from about 1½ inches to about 2½ inches.

9. The portable armrest for vehicle drivers according to claim 1, wherein
the height said rectangular top portion is about 2 inches.

10. The portable armrest for vehicle drivers according to claim 1, wherein
the height said pentagonal lower portion is from about 6 inches to about 8 inches.

11. The portable armrest for vehicle drivers according to claim 1, wherein
the height of said pentagonal lower portion is about 7 inches.

* * * * *